US006889158B2

(12) United States Patent
Penov et al.

(10) Patent No.: US 6,889,158 B2
(45) Date of Patent: May 3, 2005

(54) TEST EXECUTION FRAMEWORK FOR AUTOMATED SOFTWARE TESTING

(75) Inventors: Francislav P. Penov, Bellevue, WA (US); Kavita Kamani, Issaquah, WA (US); Samuel D. Patton, III, Woodinville, WA (US); Randy Alan Chapman, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 112 days.

(21) Appl. No.: 10/611,613

(22) Filed: Jun. 30, 2003

(65) Prior Publication Data

US 2004/0267485 A1 Dec. 30, 2004

(51) Int. Cl.[7] .......................... G01M 19/00; G06F 11/00
(52) U.S. Cl. ........................ 702/119; 714/37; 714/38; 717/125
(58) Field of Search .......................... 702/57, 117, 119, 702/120, 121, 188; 714/32, 37, 38; 717/125; 703/21, 22

(56) References Cited

U.S. PATENT DOCUMENTS

| | | | |
|---|---|---|---|
| 5,513,315 A | 4/1996 | Tierney et al. ................. | 714/37 |
| 5,548,718 A | 8/1996 | Siegel et al. ................... | 714/38 |
| 5,594,892 A | 1/1997 | Bonne et al. ................. | 703/22 |
| 5,708,774 A | 1/1998 | Boden ........................ | 714/38 |
| 5,742,754 A * | 4/1998 | Tse ............................ | 714/38 |
| 5,862,362 A | 1/1999 | Somasegar et al. ........... | 703/21 |
| 6,353,897 B1 | 3/2002 | Nock et al. ................... | 714/38 |
| 6,513,133 B1 | 1/2003 | Campbell .................... | 714/38 |
| 6,546,506 B1 | 4/2003 | Lewis ........................ | 714/38 |
| 6,557,120 B1 | 4/2003 | Nicholson et al. ............ | 714/38 |
| 2004/0123272 A1 * | 6/2004 | Bailey et al. ................ | 717/125 |

OTHER PUBLICATIONS

Parissis, Ioannis and Vassy, Jerome; "Strategies for Automated Specification–Based Testing of Synchronous Software"; Proceedings 16th Annual International Conference on Automated Software Engineering (ASE 2001); Nov. 26–29, 2001; p. 364–7.

Edwards, Stephen H.; "A Framework for Practical, Automated Black–Bo Testing of Component–Based Software"; *Software Testing, Verification and Realibility*; Jun. 2001; vol. 11, No. 2; p. 97–111.

(Continued)

*Primary Examiner*—John Barlow
*Assistant Examiner*—John Le
(74) *Attorney, Agent, or Firm*—Workman Nydegger

(57) ABSTRACT

Methods, systems, and computer program products for testing software components without explicitly having to specify each test or test environment. A computer system for automated testing loads and parses and test file. The test file contains code sections that identify software components to test, locations sections that identify locations to run the software components, an expandable variation section that associates the software components with locations, and an expansion section that defines rules for expanding the expandable variation section. From the expandable variation section, the computer system creates expanded variation sections that associate particular software components with particular locations. Then, for each particular software component and locations, the computer system executes setup instructions to prepare for running the particular software component, executes the particular software component, and executes cleanup instructions. The test file may conform to one or more eXtensible Markup Language (XML) schemas.

35 Claims, 8 Drawing Sheets

OTHER PUBLICATIONS

Du Bousquet, L.; Ouabdesselam, F.; Richier, J.-L; and Zuanon, N.; "Lutess: A Specification–Driven Testing Environment for Synchronous Software"; Proceedings of the 1999 International Conference on Software Engineering; (IEEE Cat. No. 99CB37002); May 16–22, 1999; p. 267–76.

Tyler, David F.; "Java–Based Automated Test Systems: Management Considerations for an Open Architecture for Test"; 1999 IEEE Autotestcon Proceedings; (Cat. No. 99CH36323); Aug. 30–Sep. 2, 1999; p. 699–706.

Huey–Der Chu; Dobson, John E.; and I–Chiang Liu; "Fast: A Framework for Automating Statistics–Based Testing"; *Software Quality Journal*; Mar. 1997; vol. 6, No. 1; p. 13–36.

Parrish, Allen S.; Borie, Richard B.; and Cordes, David W.; "Automated Flow Graph–Based Testing of Object–Oriented Software Modules"; *Journal of Systems and Software*; Nov. 1993; vol. 23, No. 2; p. 95–109.

Emery, Kathleen O. and Mitchell, Brenda K.; "Multi–Level Software Testing Based on Cyclomatic Complexety"; Proceedings of the IEEE 1989 National Aerospace and Electronics Conference NAECON 1989; (Cat. No. 89CII2759–9); May 22–26, 1989; vol. 2, p. 500–7.

Howely, Paul P., Jr.; "A Comprehensive Software Testing Methodology"; Second Software Engineering Standards Application Workshop; May 17–19, 1983; p. 156–63.

Fenkam, Pascal; Gall, Harald; and Jazayeri, Mehdi; "Constructing Corba–Supported Oracles for Testing: A Case Study in Automated Software Testing"; Proceedings ASE 2002 17th IEEE International Conference on Automated Software Engineering; Sep. 23–27, 2002; p. 129–38.

Wen, Robert B.; "URL–Driven Automated Testing"; Proceedings Second Asia–Pacific Conference on Quality Software; Dec. 10–11, 2001; p. 268–72.

Ferguson, Roger and Korel, Bogdan; "Generating Test Data for Distributed Software Using the Chaining Approach"; *Information and Software Technology*; May 1996; vol. 38, No. 5; p. 343–53.

McGill, Rod; "Implementing Automation for Complete Software Testing"; Proceedings of International Conference; Managing Software Quality in the 90's; Nov. 24–25, 1992; p. 329–41.

Korel, Bogdan; Wedde, Horst; and Ferguson, Roger; "Automated Test Data Generation for Distributed Software"; Proceedings of the Fifteenth Annual International Computer Software and Applications Conference; (Cat. No. 91CH3023–9); Sep. 11–13, 1991; p. 680–5.

Saib, Sabina H. and Smoliar, Stephen W.; "Software Quality Assurance for Distributed Processing"; Proceedings of the Fifteenth Hawaii International Conference on System Sciences 1982; Jan. 6–8, 1982; vol. 1; p. 79–85.

* cited by examiner

TEST EXECUTION FRAMEWORK FOR AUTOMATED SOFTWARE TESTING

CROSS-REFERENCE TO RELATED APPLICATIONS

N/A

BACKGROUND OF THE INVENTION

1. The Field of the Invention

The present invention relates to automated software testing. More particularly, the present invention relates to methods, systems, and computer program products for testing software components without explicitly having to specify each test or test environment.

2. Background and Related Art

Testing is an integral part of the software development process. As applications are written, developers often run their code to test the particular features being added or enhanced to assure that the developer's code operates as intended. While testing, developers frequently uncover programming errors, either in the form of erroneous design (what the developer thought would work does not) or erroneous implementation (correctly designed, but improperly coded).

The testing performed by a developer, however, tends to be limited in scope, time, and environment. For example, developers tend to test what they perceive as representative scenarios without the benefit of a formal test plan. These representative scenarios usually are directed to a single feature or small set of features, rather than the feature or small set of features in the context of an overall application. In most cases, this approach is reasonable because the developer's primary responsibility is to add or enhance the feature, and therefore testing, while important, is a secondary consideration. Furthermore, because the developer often is limited to testing within his or her personal development environment, it usually is impractical for the developer to account for the large number of hardware and software environments in which end-users will put the feature to use.

Due to the limited nature of developer testing, most software development organizations include a dedicated software testing group. This software testing group is responsible for producing thorough test plans and then conducting tests in accordance with those test plans. Because the testing group's primary responsibility is testing, tests may be developed for individual features, as well as those individual features in the context of an overall application. Testing groups usually assemble a wide range of hardware and software environments that are representative of supported end-user environments.

In order to increase the amount of testing that can be performed; testing groups typically employ some form of automated testing. This allows a single tester to write test code for a particular feature within a particular environment so that the test can be repeated as often as desired. One drawback to automated testing, however, is the overhead associated with developing and maintaining tests for each relevant environment. With traditional automated software testing, tests are customized to each particular environment, which essentially requires writing a new test to cover a new environment. Furthermore, traditional automated software testing offers limited flexibility for combining one or more existing tests into a single group of tests, which typically requires writing a new combined test for each of the combinations of interest. Accordingly, methods, systems, and computer program products are desired for testing software components without explicitly having to specify each test or test environment.

BRIEF SUMMARY OF THE INVENTION

The present invention relates to methods, systems, and computer program products for testing software components without explicitly having to specify each test or test environment. In accordance with example implementations, a computer system for automated testing loads and parses a test file. Among other things, the test file contains various sections, including one or more code sections that identify one or more software components written to test the product, one or more locations sections that identify one or more locations to run the one or more software components, an expandable variation section that associates the one or more software components with the one or more locations, and an expansion section that defines rules for expanding the expandable variation section. From the expandable variation section, the computer system creates one or more expanded variation sections, each of which associates a particular one of the one or more software components with a particular one of the one or more locations. Then, for each particular software component and location, the computer system executes setup instructions to prepare for running the particular software component, then executes the particular software component, and finally executes cleanup instructions.

A variety of expansion algorithms may be used to expand the expandable variation section. For example, a list expansion algorithm may generate permutations from a list of one or more placeholders and a list of one or more substitution strings. A pair-wise expansion algorithm may generate unique combinations from a list of substitution strings and the number of substitution strings to be included in each combination. A data file expansion algorithm may replace one or more placeholders with a comma separated list of substitutes from a data file. A range algorithm may substitute for a placeholder all values within a range defined by a lower limit and an upper limit. Other types of expansion algorithms also may be used.

The test file may reference result comparators to use in comparing expected results to actual results written out during the testing process. The actual results are generated during the testing and the expected results are included in the test file. Once testing of a software component is completed, a referenced comparator performs a comparison between actual and expected results to determine if the software component is functioning properly. A log may be written to with virtually any testing information during the testing process. The log may be helpful in diagnosing problems with a particular test, and as a mechanism for documenting what testing has been performed.

The test file also may include group and set sections for grouping the expanded variation sections. When a group section is present, a group setup routine may be called prior to processing the group and a group cleanup routine may be called after processing the group. Optional setup and cleanup routines also may be called for each code and group section. Context and synchronization information may be shared between various groups and code sections as appropriate.

One or more parameter sections may be included within the test file. The parameter sections allow their data to be accessed from a code or group section that is within the same scope as the parameter section. For example, the parameters section may provide input values to a software component being tested. The test file may conform to one or more eXtensible Markup Language (XML) schemas.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for testing software components without explicitly having to specify each test or test environment. The embodiments of the present invention may comprise one or more special purpose and/or one or more general purpose computers including various computer hardware, as discussed in greater detail below.

Figure 1:
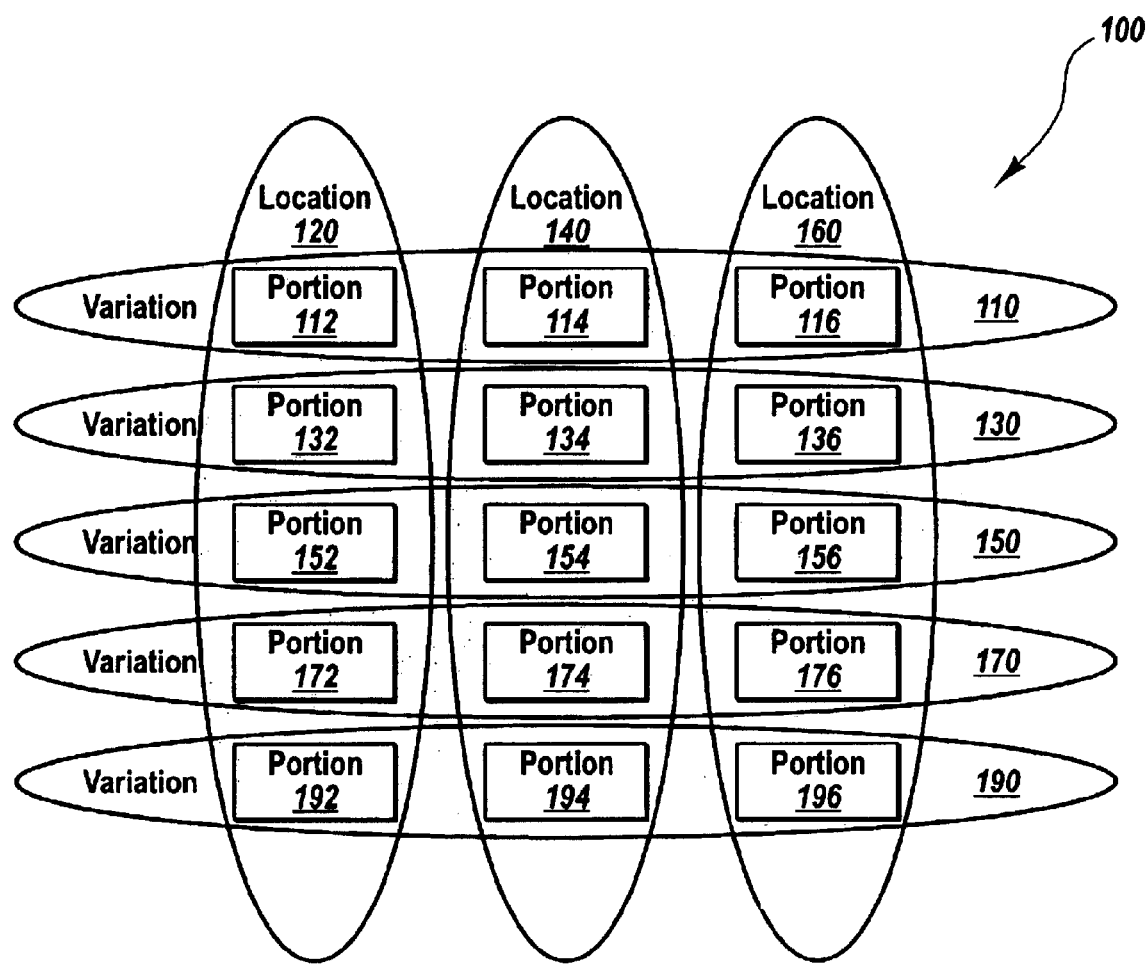
FIG. 1 illustrates a basic logical architecture of an example test execution framework in accordance with the present invention.

FIG. 1 illustrates a basic logical architecture 100 for an example test execution framework in accordance with the present invention. Prior to discussing FIG. 1 in detail, an understanding of some basic terminology will be helpful. A portion (or code) is the smallest unit of code executed by the test execution framework. In one example embodiment, a portion corresponds to a class that implements an IPortion interface, including setup, run, and cleanup methods as described in more detail below. A location is the place where the portion or code runs. In this example test execution framework, locations specify a class that implements the portion in a test file which describes the tests to run.

The pseudo code example shown in Table I helps illustrate the relationship between locations and portions. Suppose, for example, that code with a client and a server communicating over sockets needs to be tested. The test may be divided as shown in Table I.

TABLE I

| Server |
|---|
| Setup |
| open a socket<br>listen on the socket<br>accepts a connection |
| Run |
| receives N bytes of data |
| Cleanup |
| close the connection<br>close the socket |
| Client |
| Setup |
| open a socket<br>connect to server |
| Run |
| send N bytes of data |
| Cleanup |
| close the connection |

The locations in this example are the client and the server. The portions are the pseudo code shown in italics. Notice that there are no limitations on where the client and server are to be run. For example, they could be on the same machine, two threads in the same process, or on difference machines. Conceptually, the test is the same.

Variations are one or more portions that together determine the action of a test. A variation is defined by associating what to run (code or portion) with where to run (location). For example, a variation may have a client and server portions that together execute the test. The client may send a message to the server, which validates the message. There could be a number of variations for the client/server test. One test might include three variations that vary in the number of bytes that are sent and received, such as 0 MB, 1 MB, and 5 GB. Each variation passes or fails separately, but if the client or server fails at any processing step, that portion of the test fails, which leads to the entire variation failing.

Variations are members of groups. A group handles things that a number of portions need. In this example test execution framework, a group is a class that implements an IGroup interface, including setup and cleanup methods. Continuing with the example above, consider how the server uses sockets. The server currently opens a new listening socket for each variation. This is not a particularly realistic scenario. Normally, a server would open one socket for listening and perform a number of accepts on that socket, not just one. Accordingly, the pseudo code from Table I can be modified as shown in Table II, where the open/close code is moved to a group setup so that it is run only once for all of the variations in a group.

TABLE II

| MyGroup |
|---|
| Location = Server |
| Setup |
| open a socket<br>listen on the socket |

TABLE II-continued

Cleanup close the socket
Server (member of MyGroup)

Setup accepts a connection
Run receives N bytes of data
Cleanup close the connection
Client (member of MyGroup)

Setup open a socket
connect to server
Run send N bytes of data
Cleanup close the connection Notice that the server location now only accepts a connection, receives the data, and closes the connection. The setup and cleanup of the listening socket occurs in the group setup and cleanup for the server location. Also notice that no change occurred in the client location. Since the server and client are both in the same variation, they are both members of MyGroup. However, there is nothing done by MyGroup for the client location so no code is specified.

A set is a logical grouping of variations. For example, a set could include all of the Kerberos security tests, or any other grouping that a test writer may desire. There is no code, such as setup and cleanup routines, associated with a set. Sets, however, may include parameters, as discussed in greater detail below.

With reference to FIG. 1 then, portions are the actual code that is executed by the framework. Accordingly, portions also may be referred to simply as code. Locations are where each portion runs. For example, portions 112, 132, 152, 172, and 192 run at location 120; portions 114 134, 154, 174, and 194 run at location 140; and portions 116, 136, 156, 176, and 196 run at location 160. All portions in a location run in the same thread of execution. The actual physical location of locations 120, 140, and 160, i.e., machine, process, domain, and thread, are determined at runtime by the test execution framework.

Variations contains references to portions. For example, variation 110 references portions 112, 114, and 116; variation 130 references portion 132, 134, and 136; variation 150 references portions 152, 154, and 156; variation 170 references portions 172, 174, and 176; and variation 190 references portion 192, 194, and 196. Each portion runs some code and indicates a result. If all of the portions in a variation pass, then the variation passes. The portions in a variation all run in parallel.

One possible run of the case illustrated in FIG. 1 would be to have each location 120, 140, and 160 represent a separate machine. Another run could have each location on the same machine, but in different processes, or two locations on one machine in one process, and another location on another machine. All are valid and supported scenarios.

Figure 2A:
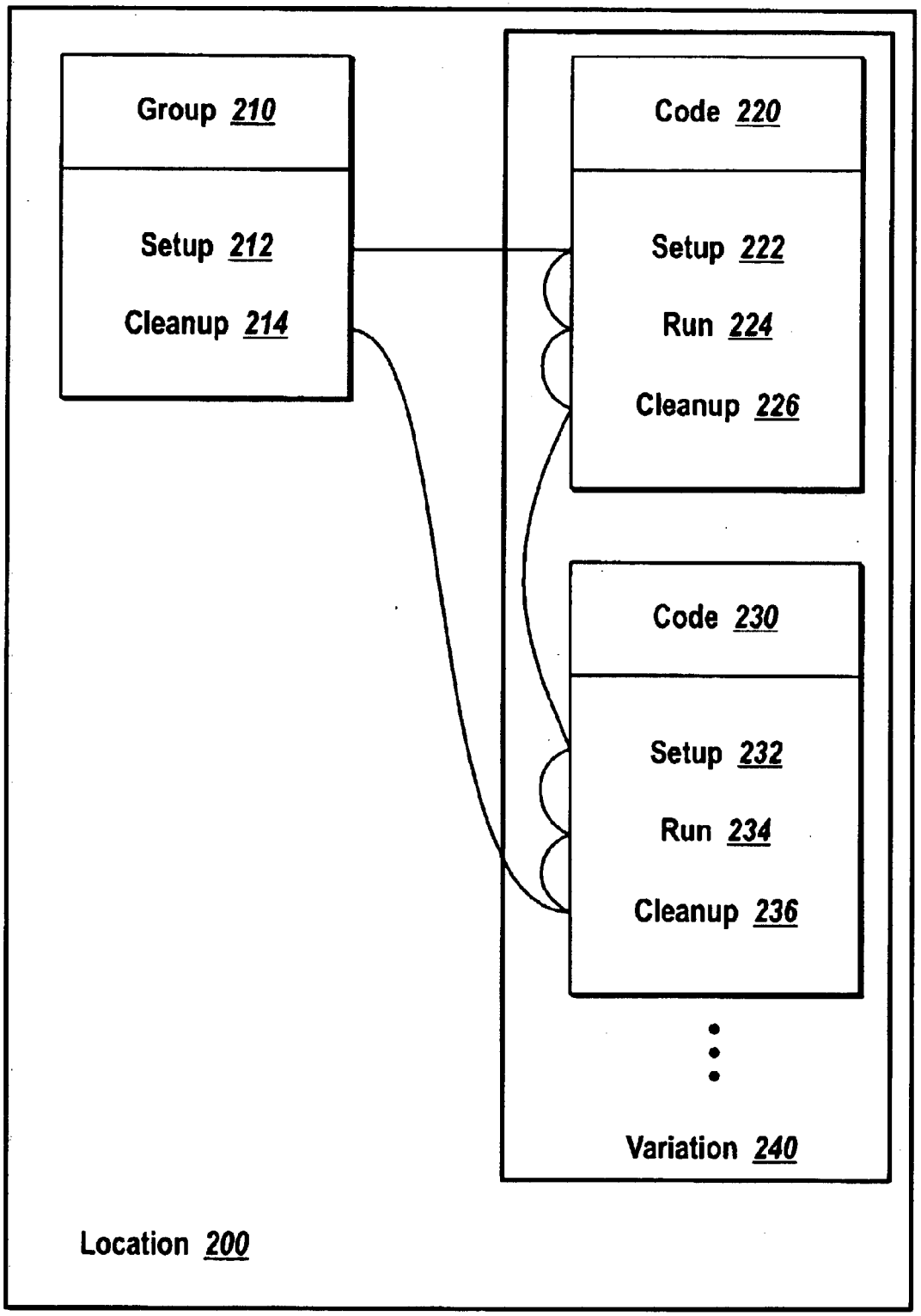
FIGS. 2A–2B show relative execution order in accordance with example implementations of the present invention.
Figure 2B:
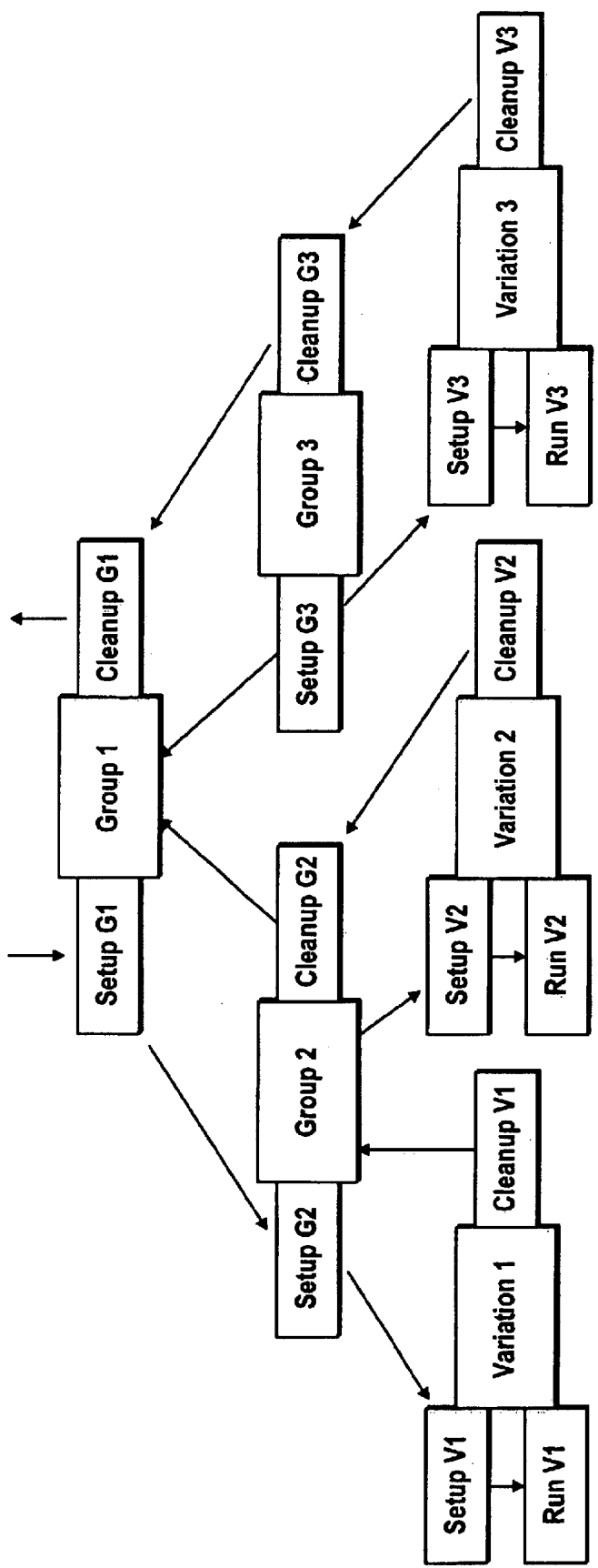

FIGS. 2A–2B show the relative execution order for groups, variations, and code in accordance with an example implementation of a test execution framework. FIG. 2A illustrates a location 200, executing a group 210 that includes variation 240, with code 220 and 230. First, the setup routine 212 for group 210 is run. Next, the setup routine 222 of code 220 for variation 240 runs. Following setup routine 222, the actual code for testing a software component, run routine 224 executes. Once run routine 224 executes, cleanup routine 226 runs, and processing of code 220 is complete. Similar to code 220, code 230 begins by running setup 232, followed by executing the actual code 234 for testing a software component, and then cleanup routine 236 runs. This same pattern repeats for all code that is within variation 240.

FIG. 2B illustrates relative execution order for multiple groups and variations. Note that each variation shows a consolidated setup, run, and cleanup routine for all portions referenced within the variation. Each group, group 1, group 2, and group 3, includes corresponding setup and cleanup routine. Processing begins with setup g1 for group 1, followed by setup g2 for group 2 and setup v1 for variation 1. After run v1 and cleanup v1 for variation 1, group 2 executes setup v2, run v2, and cleanup v2 for variation 2. Once all of the variations for group 2 have completed execution, cleanup g2 for group 2 runs. Next, setup g3 for group 3 runs, followed by setup v3, run v3, and cleanup v3 for variation 3. After variation 3, cleanup g3 for group 3 and cleanup g1 for group 1 execute.

Parameters are available to portions and groups. They are passed to each portion or group through the execution engine argument of the setup, run, and cleanup methods. Parameters are specified in the test file and are scoped as illustrated in Table III.

TABLE III

Global
    Locations
        Group
            Locations
                Set
                    Locations
                        Variation
                            Location For example, a parameter that is specified at the set level is available to all portions within that set, but not to a portion in a different set. Notice that group does not have access to the set, variation, or portion level parameters because groups exist at a higher level than sets, variations, or portions.

It should also be pointed out here that there may be multiple location sections at multiple levels of a test file. The deeper scoped locations have the same identifier as the global locations. The deeper ones are only for adding parameters and default locations. Each of the deeper location nodes refers to corresponding global location nodes by the corresponding global location node's identifier.

As described in greater detail below, a simple test project may be used to illustrate test execution framework development. The test is for a stream reader class constructor that takes a string as an argument:

StreamReader(string);

First, the portion that will execute the test is shown in Table IV and described line by line in Table V. An eXtensible Markup Language (XML) test file to execute the portion is shown in Table VI and described line by line in Table VII. Some portions have been replaced with ellipses for ease of reading.

TABLE IV

```
1-   using System;
2-   using System.IO;
3-   using company.project.Test.Framework;
4-
5-   namespace company.project.Test.Framework.Samples.Sample1
6-   {
7-       public class Client : IPortion
8-       {
9-           public void Setup(ExecutionEngine ee)
10-          {
11-              ee.Log.Trace("Test Setup");
12-          }
13-
14-          public void Run(ExecutionEngine ee)
15-          {
16-              ee.Log.Trace("Test Run");
17-              try {
18-                  StreamReader sr =
19-                      new StreamReader((String)
20-                      ee.Context["FileName"]);
21-                  sr.Close( );
22-                  ee.Results.Write("Success");
23-              }
24-              catch
25-              {
26-                  ee.Results.Write("Exception");
27-              }
28-
29-          public void Cleanup(ExecutionEngine ee)
30-          {
31-              ee.Log.Trace("Test Cleanup");
32-          }
33-      }
34-  }
```

The portion shown in Table IV to execute the test is described line by line in Table V.

TABLE V

| Line | Description |
| --- | --- |
| 3 | This is the using statements needed to write a TEF portion |
| 7 | This is the class that implements the IPortion interface for the client Location |
| 9 | This is the Setup( ) method of the IPortion interface. In this case, we don't have any code needed. |
| 11, 16, 31 | These log Trace messages into the log file. Depending on the logging level, these may or may not be written out. |
| 14 | This is the Run( ) method of the IPortion interface. It actually executes the test. The Results will be evaluated and success will be determined |
| 20 | This gets the value of FileName from the Context object. See lines 22–25 and 44–47 of the TEF file to see this Parameter being defined |
| 22 | This writes the result "Success" to the results object. This will be compared to either line 34 or 56 of the TEF file to determine success, depending on which variation is run |
| 29 | This is the Cleanup( ) method of the IPortion interface. In this case, we don't have any code needed |

The XML test file to execute the portion or code is shown in Table VI, below

TABLE VI

```
1-  <TestSpec>
2-      <Locations>
3-          <Location>
4-              <ID>Local</ID>
5-              <Description> ... </Description>
6-          </Location>
7-      </Locations>
8-      <DefaultClassLocation>
9-          <Assembly>...Sample1</Assembly>
```

TABLE VI-continued

```
10-         <Namespace>...Sample1</Namespace>
11-     </DefaultClassLocation>
12-     <Sets>
13-         <Set>
14-             <ID>StreamReader Create</ID>
15-             <Description> ... </Description>
16-             <Variations>
17-                 <Variation>
18-                     <ID>Exists</ID>
19-                     <Level>Sanity</Level>
20-                     <Description> ... </Description>
21-                     <Parameters>
22-                         <Parameter>
23-                             <Key>FileName</Key>
24-                             <Value>Exists</Value>
25-                         </Parameter>
26-                     </Parameters>
27-                     <Locations>
28-                         <Location>
29-                             <ID>Local</ID>
30-                             <Code>
31-                                 <Class>Client</Class>
32-                             </Code>
33-                             <Results>
34-                                 <Result>Success</Result>
35-                             </Results>
36-                         </Location>
37-                     </Locations>
38-                 </Variation>
39-                 <Variation>
40-                     <ID>NotExists</ID>
41-                     <Level>Sanity</Level>
42-                     <Description> ... </Description>
43-                     <Parameters>
44-                         <Parameter>
45-                             <Key>FileName</Key>
46-                             <Value>Non-Existing</Value>
47-                         </Parameter>
48-                     </Parameters>
49-                     <Locations>
50-                         <Location>
51-                             <ID>Local</ID>
52-                             <Code>
53-                                 <Class>Client</Class>
54-                             </Code>
55-                             <Results>
56-                                 <Result>Exception</Result>
57-                             </Results>
58-                         </Location>
59-                     </Locations>
60-                 </Variation>
61-             </Variations>
62-         </Set>
63-     </Sets>
64- </TestSpec>
```

The XML test file to execute the portion or code is described line by line in Table VII, below.

TABLE VII

| Line | Description |
| --- | --- |
| 1 | Opening tag |
| 2–7 | Locations defined for this test |
| 3–6 | The Local location. This is the only location for this test |
| 4 | This is the ID of the location. This is referenced by Variations which specify the code that is to run in each Location. Must be unique. |
| 5 | Long description of the Location |
| 8–11 | DefaultClassLocation. If code is defined without an assembly or namespace, then this assembly and namespace are used. |
| 12–63 | All of the Sets that will be defined in this test |
| 13–62 | Definition of the StreamReader Create Set. There is only one set in this example |

TABLE VII-continued

| Line | Description |
|---|---|
| 14 | This is the ID of the Set. It must be unique. This can be referenced from the command line to run a specific Set. |
| 15 | Long description of the Location. |
| 16–61 | Variations that comprise the Set. There are two variations in this Set. |
| 17–38, 39–60 | A Variation in the Set. |
| 18, 40 | This is the ID of the Variation. It must be unique within the Set. |
| 19, 41 | Level of the Variation. This can be referenced from the command line to specify which Variations to run. For example, this could be BVT, or Sanity, or Stress . . . |
| 15, 42 | Long description of the Variation |
| 21–26, 43–48 | Parameters section. This contains the Parameters that are defined for this Variation. |
| 22–25, 44–47 | This defines a Parameter. It's "Key" is FileName, and its Value is "Exists" (or "Non-Existing"). See Code line 20 above to see it being accessed. |
| 27–37, 49–59 | This defines all of the Locations and code (Portions) that have to run in those locations for this Variation. This variation only associates code with one location. |
| 28–36, 50–58 | This defines the only Location and its properties (code etc) for this Variation. |
| 29, 40 | This specifies the ID of the Location that this code has to run at. The code runs at Location "Local". See lines 3–6 to see this Location being defined. |
| 31, 53 | This defines the actual Code that needs to be run to execute this Portion. Note that only the class is given. The Assembly and Namespace are taken from the DefaultClassLocation in line 8–11. |
| 33–35, 55–57 | This defines the Results to be expected for this Portion. See lines 22 and 26 in the Code to see the actual results being filled in. |

As described above, groups implement an IGroup interface, portions implement an IPortion interface. Both groups and portions also may implement an IOptionalSetup interface. Each of these interfaces is illustrated in Table VIII.

TABLE VIII

```
interface IGroup
{
    void Setup(ExecutionEngine ee);
    void Cleanup(ExecutionEngine ee);
}
public interface IPortion
{
    void Setup(ExecutionEngine ee);
    void Run(ExecutionEngine ee);
    void Cleanup(ExecutionEngine ee);
}
public interface IOptionalSetup
{
    void OptionalSetup(ExecutionEngine ee);
    void OptionalCleanup(ExecutionEngine ee);
}
```

As indicated above in connection with FIG. 2B, setup for the IGroup interface is called before any of the portion code and cleanup is called after all of the portion code for the group is complete. Throwing an exception from either method indicates failure. For the IPortion interface, setup is called first, run is called second, and cleanup is called last. Run may be called multiple time in a stress test scenario. Setup and cleanup indicate failure by throwing exceptions. Run puts strings into a results object, and failure is derived by comparing the results object with expected results included in the test file.

The IOptionalSetup interface is an interface that can be implemented by groups and portions. OptionalSetup is called before setup and OptionalCleanup after cleanup. The two methods indicate failure by throwing an exception. If OptionalSetup fails, setup is not executed, and if cleanup fails, OptionalCleanup will not be executed. Since IOptionalSetup interface methods can be skipped from the command line by using the command line options /nosetup and /nocleanup, these methods are well-suited for persistent changes, such as writing to a file or configuration information registry. Using /nosetup or /nocleanup may be helpful while reproducing and debugging test failures, such as when it is desirable to examine machine state after the failure or to put the machine in a certain state before the test case.

Figure 3:
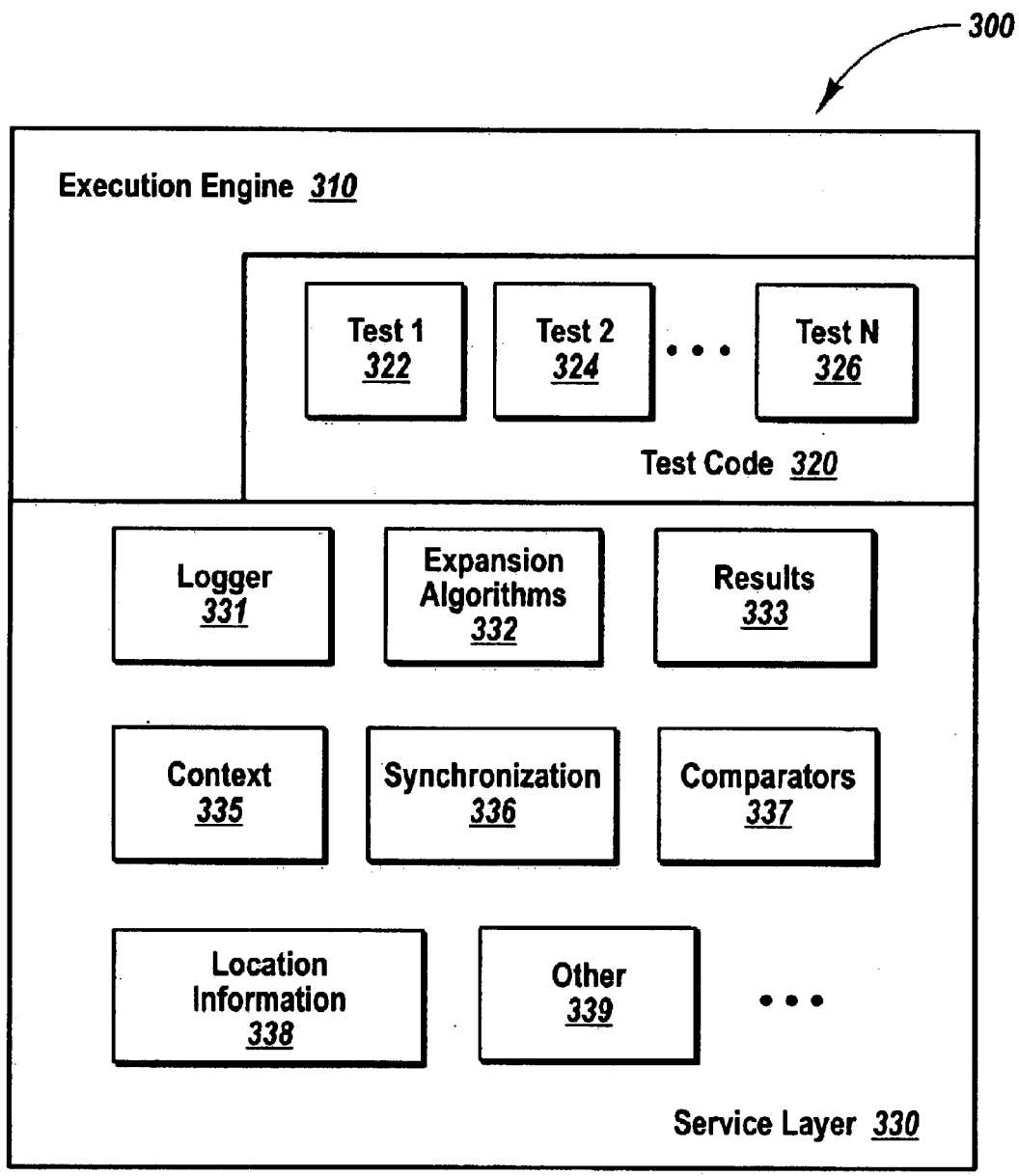
FIG. 3 shows an example embodiment of a test execution framework in accordance with the present invention.

FIG. 3 shows an example embodiment of a test execution framework 300 in accordance with the present invention. Test execution framework 300 includes execution engine 310, test code 320, and service layer 330. Test code 320 includes a variety of tests, including test 1 322, test 2 324, and test n 326. As described in further detail below, the extensible service layer 330 includes logger 331, expansion algorithms 332, results 333, context information 335, synchronization information 336, comparators 337, location information 338, other 339, etc. By making service layer 330 extensible, test execution framework 300 can be customized and enhanced to address a variety of testing needs and circumstances that previously required. Default implementations are provided for each component shown in service layer 330, but a tester may change the code assembly and narmespace to point to any desired customized implementations. It should be noted here that execution engine may refer to the code that actually executes a test, as in execution engine 310, and/or an object as described in greater detail below.

As indicated in the tables above, an execution engine parameter is passed to the setup, run, and cleanup functions of the IGroup, IPortion, and IOptionalSetup interfaces. The following objects are accessible from the execution engine parameter: Context, SharedContext, Logger, Results, MyLocationID, LocationInformation, IsPortionReadyTofinish, IsTimeToFInishPortion, WaitForMyPortionFinish, and WaitForSharedContextItem. Each of these objects is described in more detail below.

The context and shared context 335 are string addressable relational arrays of objects. They are used for passing information into and between portions and groups. The context and shared context are accessed as follows, assuming ee to be the execution engine:

ee.Context["key"]=Value;

Value=ee.Context["key"];

Note that setting a key to null removes the data from the top of the scoped context and will uncover the value from the previous context if the key exists in the previous context. A shared context is assigned by the previous code or portion, whereas context information can originate in a test file or be assigned by a previous higher code. In other words, context may not be assigned by peer portions at the same level, but may be assigned, for example, from a group for code within the group. Context is valid for the current level and all deeper levels, but disappears when the portion cleanup finishes. Shared context is valid for current and all subsequent code.

Contexts are implemented as a stack of contexts. When the context at the top is asked for a parameter, it performs a lookup on itself, and if the parameter is not found, the current context ask the next context in the stack for the parameter. Contexts are added to the stack as environment variables first, and then configuration parameters, and finally parameters defined in the test file. Accordingly, parameters defined in the test file override configuration parameters, which override environment variables.

Logger 331 is used to log test information to a log. Along with the test information message, the time and log level also are logged. Available log levels include always, trace, warning, and error. As indicated above, logger 331 is extensible and may include one or more custom loggers to cover a variety of logging requirements. Method names for the Logger 331 correspond to these levels, and are shown below in Table IX. The log level for a test run may be given as a command line parameter.

TABLE IX

```
public void Always(
    string message
);
public void Error(
    string message
);
public void Warn(
    string message
);
public void Trace(
    string message
);
```

Message is the string that will be put into the log file. Assuming ee is the execution engine parameter, logging may be accessed as follows:

ee.Logger.Trace("Starting open");
ee.Logger.Error("Open FAILED");

Results 333 is used to write out results for determining the pass or fail results of a portion. For the example test execution framework 300, the portion should only output things through results 333 that can be statically compared to a string, as the expected results are given as a string in the test file. As indicated above, however, service layer 330 is extensible and provides for extensible comparators 337 to compare actual and expected results. Accordingly, the results may take any of a variety of formats, based on the comparators that are available for a particular test execution framework implementation. Example methods for results 333 are given below in Table X.

TABLE X

```
void WriteMultiple(
    object[ ] results);
    Calls Write(object o) for each object o in the
    object[ ] array
void Write(
    string str);
    Writes out the given string to the result object
void Write(
    string str,
    params object[ ] args);
    Writes out the object[ ] array using the passed
    in string as a formatting string
void Write(
    object o);
    Writes out the object o as a string using its ToString method
```

Assuming ee is the execution engine parameter, results may be written as follows:

ee.Results.Write("Received {0} bytes", NumBytes);

Location information 338 is a table that contains location information for all locations that are being used in a test. Each entry includes the following string fields: ID—unique location ID; name—location name; and, MachineName— machine name for the machine where the location is execution. Location information is indexed by the location ID, which as indicated above is a string. MyLocationID is the location ID of the current portion. Usage is as follows:

string S=ee.LocationInformation["Server"].MachineName;

string S=ee.MyLocationID;

There are four synchronization objects 336: IsPortionReadyToFinish, IsTimeToFinishPortion, WaitForMyPortionFinish, and WaitForSharedContextItem. Each of these objects is shown with more detail below in Table XI.

TABLE XI

```
public bool IsPortionReadyToFinish;
    ee.IsPortionReadyToFinish = true;
public bool IsTimeToFinishPortion;
    while (!IsTimeToFinishPortion)
    {
        Thread.Sleep(1000);
    }
public void WaitForMyPortionFinish( );
    WaitForMyPortionFinish( );
    ee.Logger.Trace("Portion Done");
public bool WaitForSharedContextItem(
    string Key,
    string Value
);
public bool WaitForSharedContextItem(
    string Key,
    string Value,
    string Message
);
public bool WaitForSharedContextItem(
    string Key,
    string Value,
    string Message,
    int maxTotalTimeToWait
);
Key
    This is the name of the key that you want to wait
    for in the shared context.
Value
    This is the value of the key that you want to wait for.
Message
    This is a message that is printed out to the log if
    the wait takes longer than 1 second.
        This is for debugging. The default value
        for this message is Portion
        <myLocationID> waiting for key "<key>"
        to have value "<value>"
maxTotalTimeToWait
    This is the time to wait for the key to get the
    specified value. The default is
        Timeout.Infinite.
    if (!WaitForSharedContextItem("ServerReady", "true"))
    {
        ee.Results.Write("WaitForSharedContextItem -
        ServerReady - true, failed);
        return;
    }
```

Expansion algorithms 332 may be used in test files. Expansion algorithms allow a test writer to specify rules for creating sections of the test file, rather than having to explicitly list all of the sections. As in other areas of service layer 330, these expansion algorithms 332 are extensible and may be customized to handle a variety of expansion needs with relatively little effort. A simple example is shown below in Tables XII A–C and XIII A–B. The example uses a list expand algorithm to take the name METHOD and replace it with "TCP" and "Remoting" in the test file. List expansion can be used to create new sets and variations by putting these chunks of XML in the correct location. The locations that are allowed to be expanded will be described later.

TABLE XII A

| | |
|---|---|
| 1 | <ExpansionInstructions> |
| 2 |    <Code> |
| 3 |       <Class>ListExpansionAlgorithm</Class> |
| 4 |    </Code> |

Lines 2–4 above indicate the class to load to perform the expansion.

TABLE XII B

| | |
|---|---|
| 5 | <Details xsi:type="ListExpansionDetails"> |
| 6 |    <ExpansionPlaceholders> |
| 7 |       <Placeholder>METHOD</Placeholder> |
| 8 |    </ExpansionPlaceholders> |

Line 7 tells the expansion algorithm what string is being used as a placeholder for the substitutions.

TABLE XII C

| | |
|---|---|
| 9 | <List> |
| 10 |   <ListItem> |
| 11 |     <Substitution> |
| 12 |       <Placeholder>METHOD</Placeholder> |
| 13 |       <Value>Tcp</Value> |
| 14 |     </Substitution> |
| 15 |   </ListItem> |
| 16 |   <ListItem> |
| 17 |     <Substitution> |
| 18 |       <Placeholder>METHOD</Placeholder> |
| 19 |       <Value>Remoting</Value> |
| 20 |     </Substitution> |
| 21 |   </ListItem> |
| 22 |   </List> |
| 23 |   </Details> |
| 24 | </ExpansionInstructions> |

Lines 10–15 and 16–21 give substitution values for the placeholder. This will create two different replacements, "Tcp" and "Remoting."

The expansion algorithm can be used in various places within the test file, such as the following four places described below. Placing this code within a <Set> node will make copies of the set with the expansion being the only change. Placing this code inside a <Variation> node will make copies of the variation with the expansion being the only change. Placing this expansion code inside a <Sets> node has the same effect as placing it inside every <Set> node. Similarly, placing the expansion code inside the <Variations> node has the same effect as placing it inside every <Variation> node within the current <Set>. An example use of the expansion instruction illustrated in Tables XII A–C is shown in Tables XIII A–B.

TABLE XIII A

```
<Sets>
    <Set>
        <EXPANSION NODE FROM ABOVE>
        <ID>Min %METHOD%</ID>
        <Variations>
            <Variation>
                <ID>MinTest1</ID>
                <Group>%METHOD%</Group>
                <Locations>
                    <Location>
                        <ID>Client</ID>
                        ....
                    </Location>
                    <Location>
```

TABLE XIII A-continued

```
                        <ID>Server</ID>
                        ....
                    </Location>
                </Locations>
            </Variation>
        </Variations>
    </Set>
</Sets>
```

The example use of the expansion instruction illustrated in Table XIII A will produce the test file fragment shown in Table XIII B after the expansions has run. Notice that there are now two sets, one with the <ID> "Min Tcp" and the other with the <ID> of "Min Remoting."

TABLE XIII B

```
<Sets>
    <Set>
        <ID>Min Tcp</ID>
        <Variations>
            <Variation>
                <ID>MinTest1</ID>
                <Group>Tcp</Group>
                <Locations>
                    <Location>
                        <ID>Client</ID>
                        ....
                    </Location>
                    <Location>
                        <ID>Server</ID>
                        ....
                    </Location>
                </Locations>
            </Variation>
        </Variations>
    </Set>
    <Set>
        <ID>Min Remoting</ID>
        <Variations>
            <Variation>
                <ID>MinTest1</ID>
                <Group>Remoting</Group>
                <Locations>
                    <Location>
                        <ID>Client</ID>
                        ....
                    </Location>
                    <Location>
                        <ID>Server</ID>
                        ....
                    </Location>
                </Locations>
            </Variation>
        </Variations>
    </Set>
</Sets>
```

More generally, the list expansion algorithm takes a list of placeholders and a list of substitution strings, and creates new sets or variations by replacing the placeholders with the substitution strings.

TABLE XIV

```
<ExpansionInstructions>
    <Code>
        <Assembly>Company.Xws.Test.Framework</Assembly>
        <Class>Company.Xws.Test.Framework.Expansion.ListExpansionAlgorithm</Class>
    </Code>
    <Details xsi:type="ListExpansionDetails">
        <ExpansionPlaceholders>
            <Placeholder>String-1</Placeholder>
            <Placeholder>String-2</Placeholder>
                    ....
            <Placeholder>String-N</Placeholder>
        </ExpansionPlaceholders>
        <List>
            <ListItem>
                <Substitution>
                    <Placeholder>String-1</Placeholder>
                    <Value>String-val-1.1</Value>
                </Substitution>
                <Substitution>
                    <Placeholder>String-2</Placeholder>
                    <Value>String-val-1.2</Value>
                </Substitution>
                ....
                <Substitution>
                    <Placeholder>String-N</Placeholder>
                    <Value>String-val-1.N</Value>
                </Substitution>
            </ListItem>
            <ListItem>
                <Substitution>
                    <Placeholder>String-1</Placeholder>
                    <Value>String-val-2.1</Value>
                </Substitution>
                <Substitution>
                    <Placeholder>String-2</Placeholder>
                    <Value>String-val-2.2</Value>
                </Substitution>
                ....
                <Substitution>
                    <Placeholder>String-N</Placeholder>
                    <Value>String-val-2.N</Value>
                </Substitution>
            </ListItem>
            ....
            <ListItem>
                <Substitution>
                    <Placeholder>String-1</Placeholder>
                    <Value>String-val-3.1</Value>
                </Substitution>
                <Substitution>
                    <Placeholder>String-2</Placeholder>
                    <Value>String-val-3.2</Value>
                </Substitution>
                ....
                <Substitution>
                    <Placeholder>String-N</Placeholder>
                    <Value>String-val-3.N</Value>
                </Substitution>
            </ListItem>
        </List>
    </Details>
</ExpansionInstructions>
```

The pair-wise expansion algorithm takes an option "order" and a list of substitutions. The <Order>N</Order> tag is optional and defaults to two. This means that if the order specifies two, every possible combination of two substitutions will be tested. Similarly, if the order is three, every possible combination of three substitutions will be tested. If the order is set to zero or minus one, every possible combination of all substitutions will be tested. Substitutions are expressed as a name and a list of possible values. The name is equivalent to a placeholder in the list expansion algorithm. Any reference to %name% in the relevant section of a test file will be replaced. An example of pair-wise expansion is shown in Table XV.

TABLE XV

```
<ExpansionInstructions>
    <Code>
        <Assembly>Company.Test.Framework</Assembly>
        <Class>company.Test.Framework.Expansion.PairwiseExpansionAlgorithm</Class>
    </Code>
    <Details xsi:type="PairwiseExpansionDetails">
        <Order>2</Order>
        <Factor>
            <Name>METHOD</Name>
            <Choices>
                <ValueChoice>Tcp</ValueChoice>
                <ValueChoice>Remoting</ValueChoice>
            </Choices>
        </Factor>
        <Factor>
            <Name>Function</Name>
            <Choices>
                <ValueChoice>Min</ValueChoice>
                <ValueChoice>Max</ValueChoice>
            </Choices>
        </Factor>
    </Details>
</ExpansionInstructions>
```

Often it is desirable to substitute a range of integer values, e.g., 1 through 20, for a placeholder. It would be cumbersome, however, to use the list expansion algorithm to write twenty substitution elements. The range expansion algorithm takes a lower limit and an upper limit of a range and substitutes all the values in the range for the placeholder. Optionally, a step size may be specified to determine the amount by which successive values differ. The syntax for range expansion is shown in Table XVI. RangeSubstitution identifies the placeholder or string to be substituted, with /@min specifying the lower limit of the range, /@max specifying the upper limit of the range, and /@step specifying the incremental step size of the substitution values.

TABLE XVI

```
<ExpansionInstructions>
    <Code>
        <Assembly>Company.project.Test.Framework</Assembly>
        <Class>
            Company.project.Test.Framework.Expansion.RangeExpansionAlgorithm
        </Class>
    </Code>
    <Details xsi:type="RangeExpansionDetails">
        <RangeSubstitution min="lowerlimit" max="upperlimit" step="stepsize">
            Placeholder
        </RangeSubstitution>
    </Details>
</ExpansionInstructions>
```

Table XVII shows a specific example for the range expansion algorithm. When expanded, the test file will include five variations, with ID 5, 10, 15, 20, and 25.

TABLE XVII

```
...
<Variation>
    <ExpansionInstructions>
        <Code>
            <Assembly>Company.project.Test.Framework</Assembly>
            <Class>
                Company.project.Xws.Test.Framework.Expansion.RangeExpansionAlgorithm
            </Class>
        </Code>
        <Details xsi:type="RangeExpansionDetails">
            <RangeSubstitution min="5" max="25" step="5">
                varID
            </RangeSubstitution>
        </Details>
    </ExpansionInstructions>
```

For some tests with hundreds or more variations, the test file grows dramatically. With a large number of variations, it becomes difficult to create new variations and maintain existing ones. One solution is to move the values of the variables out to a flat data file where all values for the variables can be put on a single line. The data file expansion algorithm takes a data file name and an optional separator (the default is a comma) which delimits the substitute values for the placeholders in each line. It also takes an array of placeholders for all variables used in the expansion level. Accordingly, only one template with several variables need be used. The template will be expanded automatically to the number of lines of data in the data file. Table XVIII shows an example data file expansion test file.

TABLE XVIII

```
<Set>
    <ExpansionInstructions>
        <Code>
            <Assembly>Company.project.Test.Framework</Assembly>
            <Class>
                Company.project.Test.Framework.Expansion.DataFileBasedExpansionAlgorithm
            </Class>
        </Code>
        <Details xsi:type="DataFileBasedExpansionDetails">
            <FileName>DataFileExpansionSample.dat</FileName>
            <Separator>,</Separator>
            <ExpansionPlaceholders>
                <Placeholder>GroupID</Placeholder>
                <Placeholder>VarIndex</Placeholder>
                <Placeholder>Value1</Placeholder>
                <Placeholder>Value2</Placeholder>
                <Placeholder>Result</Placeholder>
            </ExpansionPlaceholders>
        </Details>
    </ExpansionInstructions>
    ...
</Set>
```

Table XIX shows an example data file

TABLE XIX

```
#Data file for DataFileBasedExpansion sample
#GroupId,VarIndex,Value1,Value2,Result
Addition,1,8,2,10
Addition,2,20,5,25
Subtraction,1,8,2,6
Subtraction,2,20,5,15\
```

Details for each of the sections of a test file are included below. Each section that can appear in the test file is covered in isolation first, and then an example of the complete structure is given. If a node is given in italics, it is a place holder for a full structure. See the corresponding full description.

TABLE XX

```
<Parameters>
    <Parameter>
        <Description>String</Description>
        <Key>String</Key>
        <Type>Type</Type>
        <Value>Value</Value>
        <!--Elements used to Xml Serializable Objects
            not important for string, int, etc -->
        <Code>Code element to specify assembly
            and class for object
        </Code>
        <XmlValue>
```

TABLE XX-continued

```
            <XmlSerializableType>...</XmlSerializableType>
        </XmlValue>
    </Parameter>
</Parameters>
```

There can be any number of parameter nodes inside of a parameters block. Parameter nodes are used to pass data to the group or portion code so that they can change their behavior based on the data. For example, the TCP port that a server should use could be passed in as a parameter.

Description—short description of the parameter. (OPTIONAL)

Key—key name of the parameter. This is used to access the parameter from the context.

Type—Object type of the parameter. Can be any type, or an array of them. The default is string. (OPTIONAL)

Value—value of the parameter.

XmlValue—This tag accepts arbitrary XML to allow XML serializable objects as parameters. The type of the object can be specified in the type element if the object class is defined in the assembly used on the \TestSpec\DefaultClassLocation element. If it isn't defined on that assembly it's necessary to specify the assembly and class for the parameter with a code element. (EXCLUSIVE WITH VALUE)

Code—Used to specify the assembly and type for an XmlValue (OPTIONAL if you use Type)

TABLE XXI

```
<Locations>
    <Location>
        <ID>String</ID>
        <Description>String</Description>
        <DefaultClassLocation>
        <Code>
        <RunVariations>
        <EntryPointCode>
        <Parameters>
    </Location>
</Locations
```

There can be any number of location nodes inside of a locations block. Each location is a place where portion or group code can run.

ID—unique identifier for the location

Description—description of the location

DefaultClassLocation—default loading information for portions or groups that are at this Location. This contains an assembly and namespace. (OPTIONAL)

Parameters—parameters for this location. (OPTIONAL)

Code—this element has two usages. For normal locations, it specifies a class that will be used as a default class for any variation that does not reference this location or does not have <Code> element in its reference to this location. For locations that have Run Variations=false, this element specifies the class that will be executed. (OPTIONAL)

RunVariations—Boolean; default value=true. Any variation that specifies this flag with a value of false is a long-running location, i.e. it does not execute separate variations, but instead has only one instance of the <Code> class and executes it's Setup( ), Run( ), Cleanup( ) code. If this element is present, <Code> is mandatory. (OPTIONAL)

EntryPointCode—a class that implements IGroup. It's Setup( ) will be called very early in the test execution process and its Cleanup( ) very late, thus giving the test code a chance to modify test behavior and/or to execute some location wide setup/cleanup work. The logger and shared context are not available from these two methods. (OPTIONAL)

TABLE XXII

```
<DefaultClassLocation>
    <Assembly>String</Assembly>
    <Namespace>String</Namespace>
</DefaultClassLocation>
```

Assembly—default assembly for classes

Namespace—default namespace for classes (OPTIONAL)

TABLE XXIII

```
<Code>
    <Assembly>String</Assembly>
    <Class>String</Class>
</Code>
```

Assembly—assembly to load

Class—class to create

TABLE XXIV

```
<Groups>
    <Group>
        <ID>String</ID>
        <Parameters[1]>
        <DefaultClassLocation[1]>
        <Locations>
            <Location>
                <ID>String</ID>
                <DefaultClassLocation[2]>
                <Code>
                <Parameters[2]>
            </Location[1]>
        </Locations>
    </Group>
</Groups>
```

Groups and locations both have code sections. There can be any number of location nodes defined under locations. There will be one for each location that the group implements code for.

ID—unique identifier for the group or location

Parameters[1]—parameters that apply to the entire group (OPTIONAL)

DefaultClassLocation[1]—default class location for the entire group (OPTIONAL)

Locations—collection of all of the locations that the group runs in

Location[1]—a particular location, identified by the ID

Location[2]

DefaultClassLocation[2]—default class location for the group that runs in this location (OPTIONAL)

Code—code section that defines the class that implements the group at the location Parameters[2]—parameters that apply to the group as running in the particular location (OPTIONAL)

TABLE XXV

```
<Sets>
    <Set>
        <ID>String</ID>
        <Description>String</Description>
        <Parameters[1]>
        <Locations>
            <Location>
                <ID>String</ID>
                <Parameters[2]>
            </Location>
        </Locations>
        <Variations>
    </Set>
</Sets>
```

There can be any number of set nodes within sets. There can be any number of location nodes under locations, but the location string must match one of the globally named locations.

ID—unique identifier of the set (Name—friendly name for the set

Description—description of the set

Parameters[1]—parameters that apply to all sub nodes in the set (OPTIONAL)

Locations—list of locations that have parameters for this set (OPTIONAL)

Location—a particular location, identified by ID

Parameters[2]—parameters that apply to the specified location for this set

Variations—the variations that make up this set

TABLE XXVI

```
<Variations>
    <Variation>
        <ID>String</ID>
        <Level>String</Level>
        <Description>String</Description>
        <Parameters>
        <Group>String</Group>
        <Locations>
    </Variation>
</Variations>
```

There can be any number of variation nodes in variations. If present, the group string must match one of the defined groups.

ID—identifier for this Variation. This must be unique within the set it is contained in.

Level—this identifies the level of the variation. This is an arbitrary string that groups a certain type of Variation together. For example, all build verification test (BVT) tests could have their Level defined as BVT, which would allow the test execution framework to run all BVT tests in a test file. (BVT tests are tests which are normally run first when a new build of a software product under test is produced. If this first, basic level of testing fails, then proceeding with further testing should be reconsidered because the build does not meet the minimum quality requirements needed to justify more extensive testing.)

Description—this is a description of the variation

Parameters—parameters that apply to all portions in the variation (OPTIONAL)

Group—this identifies the group that the variation is a part of. If this is not present, the variation is a member of the "default" group. (OPTIONAL)

Locations—this defines locations and associates the code with them (portions) that make up this variation

TABLE XXVII

```
<Variation>
    ...
    <Locations>
        <Location>
            <ID>String</ID>
            <Parameters>
            <Code>
            <Results>
        </Location>
```

TABLE XXVII-continued

```
        </Locations>
        ...
</Variation>
```

For each variation, location and code are associated in order to identify what code runs in what location. Any location defined in the global locations tag can be placed here. There should be an ID for each referenced location, and there should be associated code that runs on that location—these together with the group define any variation.

ID—this identifies the location that the code executes in. This must match one of the globally defined locations Parameters—parameters that apply to this portion. This is the lowest level of parameter. (OPTIONAL)

Code—this defines the assembly, and class that implements the portion

Results—this is the expected results for this portion. If not present, then the portion indicates a pass by returning no result entries. (OPTIONAL)

TABLE XXVIII

```
<Results>
    <Result>String</Result>
</Results>
```

There can be any number of result nodes. Each result node corresponds to one entry in the results object.

Result—one entry of the expected result.

Table XXIX below shows an outline that describes the full test file format.

TABLE XXIX

```
<TestSpec>
    <Parameters>
        <Parameter>
            <Description>String</Description>
            <Key>String</Key>
            <Type>Type</Type>
            <Value>Value</Value>
        </Parameter>
    </Parameters>
    <DefaultClassLocation>
        <Assembly>String</Assembly>
        <Namespace>String</Assembly>
    </DefaultClassLocation>
    <Locations>
        <Location>
            <ID>
            <Name>
            <Description>
            <DefaultClassLocation>
                <Assembly>String</Assembly>
                <Namespace>String</Namespace>
            </DefaultClassLocation>
            <RunVariations>Boolean</RunVariations>
            <WhenUnused>Run|Skip|Relocate</WhenUnused>
            <EntryPointCode>
                <Assembly>String</Assembly>
                <Class>String</Class>
            </EntryPointCode>
            <Code>
                <Assembly>String</Assembly>
                <Class>String</Class>
            </Code>
            <Parameters>
                <Parameter>
                    <Description>String</Description>
                    <Key>String</Key>
                    <Type>Type</Type>
                    <Value>Value</Value>
```

TABLE XXIX-continued

```
                </Parameter>
            </Parameters>
        </Location>
    </Locations>
    <Groups>
        <Group>
            <ID>
            <Parameters>
                <Parameter>
                    <Description>String</Description>
                    <Key>String</Key>
                    <Type>Type</Type>
                    <Value>Value</Value>
                </Parameter>
            </Parameters>
            <DefaultClassLocation>
                <Assembly>String</Assembly>
                <Namespace>String</Namespace>
            </DefaultClassLocation>
            <Locations>
                <Location>
                    <ID>String</ID>
                    <DefaultClassLocation>
                        <Assembly>String</Assembly>
                        <Namespace>String</Namespace>
                    </DefaultClassLocation>
                    <Code>
                        <Assembly>String</Assembly>
                        <Class>String</Class>
                    </Code>
                    <Parameters>
                        <Parameter>
                            <Description>String</Description>
                            <Key>String</Key>
                            <Type>Type</Type>
                            <Value>Value</Value>
                        </Parameter>
                    </Parameters>
                </Location>
            </Locations>
        </Group>
    </Groups>
    <Sets>
        <Set>
            <ID>String</ID>
            <Name>String</Name>
            <Description>String</Description>
            <Parameters>
                <Parameter>
                    <Description>String</Description>
                    <Key>String</Key>
                    <Type>Type</Type>
                    <Value>Value</Value>
                </Parameter>
            </Parameters>
            <Locations>
                <Location>
                    <ID>String</ID>
                    <Parameters>
                        <Parameter>
                            <Description>String</Description>
                            <Key>String</Key>
                            <Type>Type</Type>
                            <Value>Value</Value>
                        </Parameter>
                    </Parameters>
                </Location>
            </Locations>
            <Variations>
                <Variation>
                    <ID>String</ID>
                    <Level>String</Level>
                    <Description>String</Description>
                    <Parameters>
                        <Parameter>
                            <Description>String</Description>
                            <Key>String</Key>
                            <Type>Type</Type>
                            <Value>Value</Value>
```

TABLE XXIX-continued

```
                </Parameter>
            </Parameters>
            <Group>String</Group>
            <Locations>
                <Location>
                    <ID>String</ID>
                    <Parameters>
                        <Parameter>
                            <Description>String</Description>
                            <Key>String</Key>
                            <Type>Type</Type>
                            <Value>Value</Value>
                        </Parameter>
                    </Parameters>
                    <Code>
                    <Results>
                        <Result>String</Result>
                    </Results>
                </Location>
            </Locations>
        </Variation>
    </Variations>
  </Set>
 </Sets>
</TestSpec>
```

Table XXX shows an example flow control for a test file with one variation test. This flow will happen for each location that is defined in the test file which does not have a <Run Variations> element nor has <Run Variations>true</Run Variations>. All code is loaded and instantiated before any methods are called.

TABLE XXX 1. load test file
2. load location entry point assembly
3. create entry point class
4. call entry point optionalsetup, if IOptionalSetup implemented
5. call entry point setup
6. load group assembly
7. create group class
8. load portion assembly
9. create portion class (the actual test code, that implements IPortion)
10. call group optionalsetup if group implements IOptionalSetup
    a. If it throws an exception, abort all portions
11. call group setup
    a. If it throws an exception, abort all portions
12. call portion optionalsetup if portion implements IOptionalSetup
    a. If it throws an exception, fail portion
13. call portion setup
    a. If it throws an exception, fail portion
14. call portion run
15. compare results returned by portion.run to expected results
    a. If it threw an exception, compare that to the expected results
16. If results are not correct, fail portion
17. call portion cleanup
    a. If it throws an exception, fail portion
18. call portion optionalcleanup if portion implements IOptionalSetup
    a. If it throws an exception, fail portion
19. call group cleanup
    a. If it throws an exception, abort all portions
20. call group optionalcleanup if group implements IOptionalSetup
    a. If it throws an exception, abort all portions
21. call entry point cleanup
22. call entry point optionalcleanup, if IOptionalSetup implemented Table XXXI shows an example flow control for a long-running test file location. This flow will happen for a location that is defined in the test file and has <Run Variations>false</Run Variations>. All code is loaded and instantiated before any methods are called.

TABLE XXXI 1. load test file
2. load location entry point assembly
3. create entry point class
4. call entry point optionalsetup, if IOptionalSetup implemented
5. call entry point setup
6. load location code assembly
7. create location code class
8. call location code optionalsetup, if IOptionalSetup implemented
    a. If it throws an exception, skip setup and run
9. call location code setup
    a. If it throws an exception, skip run
10. call location code run
11. call location code cleanup
    a. If it throws an exception, skip optionalcleanup
12. call location code optionalcleanup, if IOptionalSetup implemented
13. call entry point cleanup
14. call entry point optionalcleanup, if IOptionalSetup implemented The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4A:
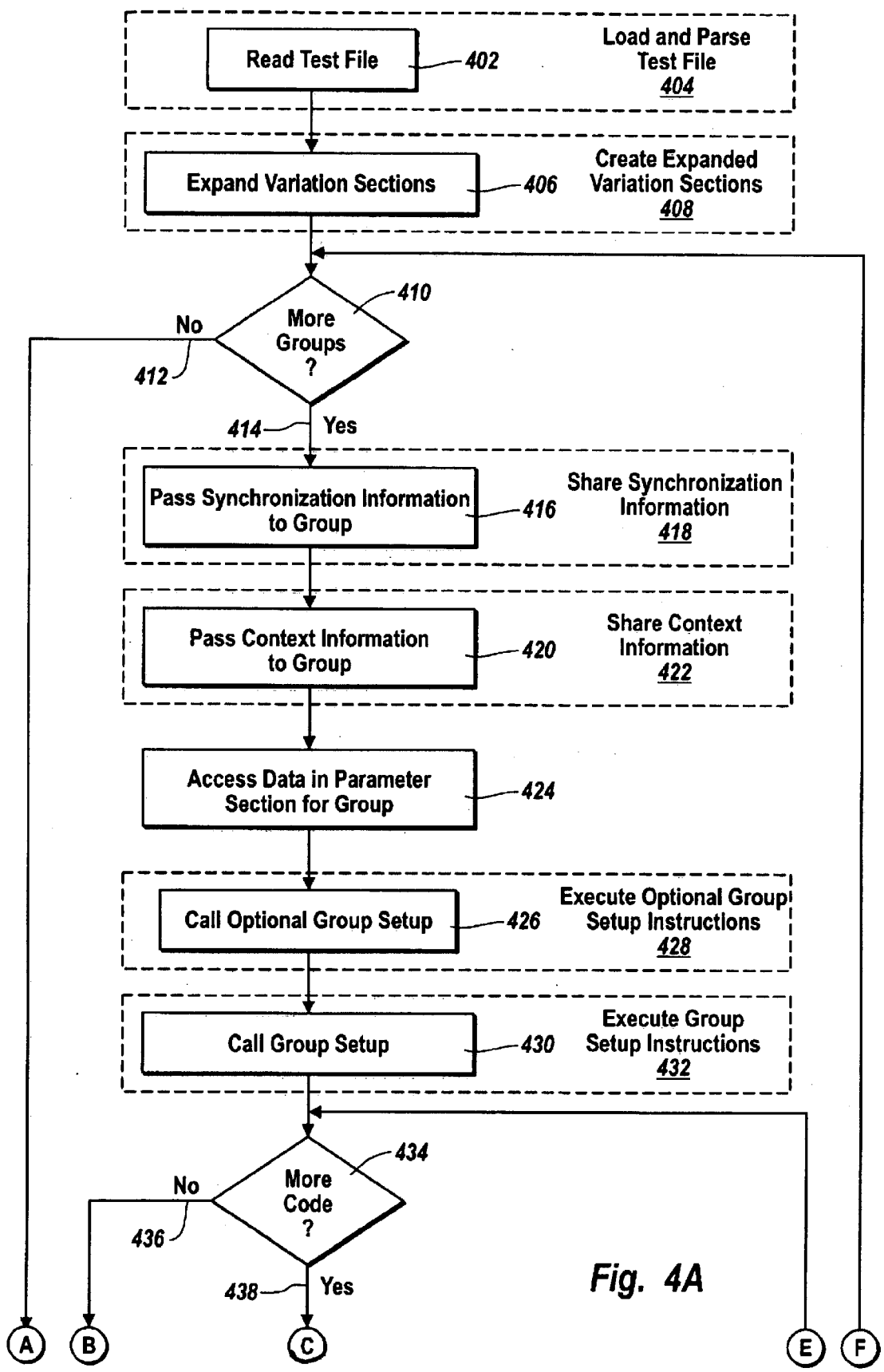
FIGS. 4A–4C show example acts and steps for methods of testing software components in accordance with the present invention.
Figure 4B:
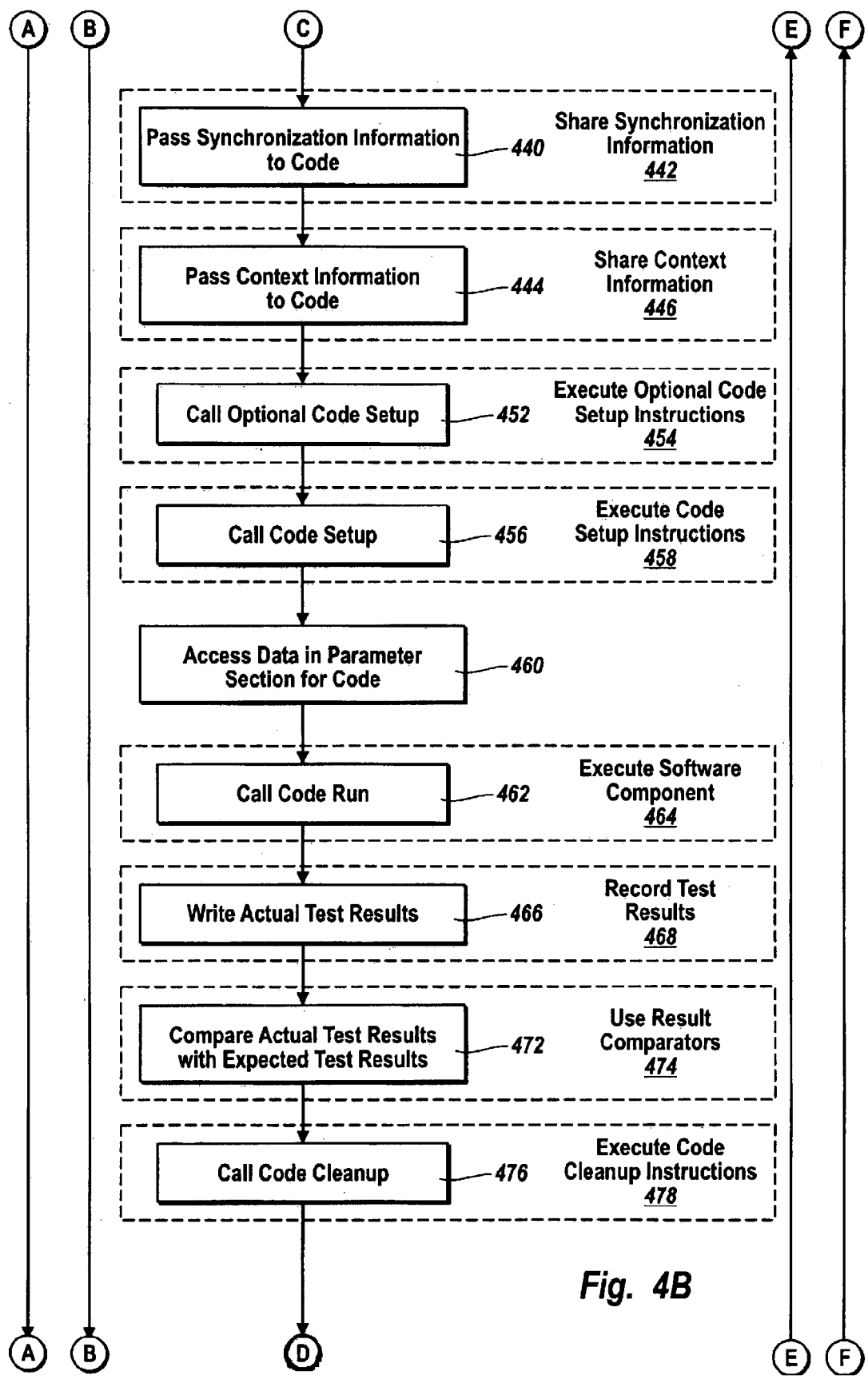
Figure 4C:
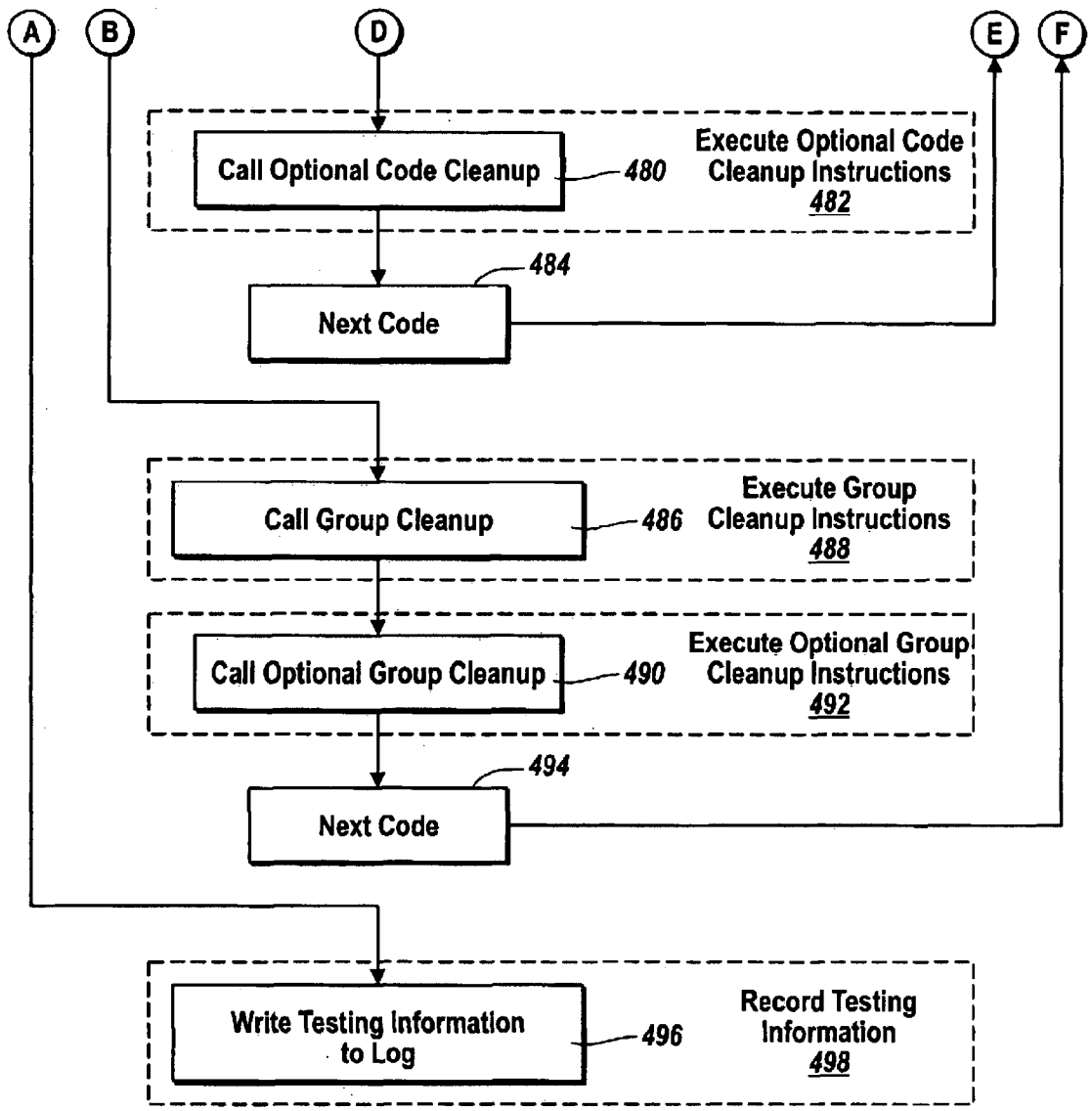

FIGS. 4A–4C show example acts and steps for methods of testing software components in accordance with the present invention. A step for loading and parsing (404) a test file may include an act of reading (402) a test file. A step for creating (408) one or more expanded variation sections from an expandable variation section may include an act of expanding (406) the expandable variation section to create the one or more expanded variation sections. Decision block 410 determines if any group sections remain to be processed. If not (no branch 412), processing jumps to a step for recording (498) testing information in a log. The step for recording (498) may include an act of writing (496) the testing information to the log. It should be emphasized here that recording and writing testing information to the log typically occur throughout the processing shown in FIGS. 4A–4C. Recording and writing testing information to the log is shown here only once merely to simply FIGS. 4A–4C If decision block 410 determines that a group section remains to be processed (yes branch 414), processing continues with a step for sharing (418) synchronization information, such as between group sections, etc. A step for sharing synchronization information (418) may include an act of passing (416) synchronization information to the group. A step for sharing (422) context information, such as between group sections, may include an act of passing (420) context information to the group. The method continues with an act of accessing (424) data within a parameter section from the group section. Although the act of accessing (424) data within a parameter section is shown only once, the accessing may occur throughout the processing illustrated in FIGS. 4A–4C.

A step for executing (428) optional group setup instructions may include an act of calling (426) an optional group setup routine. Similarly, a step for executing (432) group setup instructions may include an act of calling (430) a group setup routine. Decision block 434 determines if any code sections remain to be processed. If not (no branch 436), processing jumps to a step for executing (488) group cleanup instructions as will be discussed in more detail below. If decision block 434 determines that a code section remains to be processed (yes branch 438), processing continues with a step for sharing (442) synchronization information, such as between two code sections or between the group and the code section, etc. A step for sharing (442) synchronization information may include an act of passing (444) synchronization information to the code.

A step for executing (454) optional code setup instructions may include an act of calling (452) an optional code setup routine. Similarly, a step for executing (458) code setup instructions may include an act of calling (456) a code setup routine. The method continues with an act of accessing (460) data within a parameter section from the code section. Although the act of accessing (460) data within a parameter section is shown only once, the accessing may occur throughout the processing illustrated in FIGS. 4A–4C.

A step for executing (464) a software component may include an act of calling (462) a run routine that executes the software component. A step for recording (468) actual test results may include an act of writing (466) the test results. A step for using (474) one or more result comparators may include an act of comparing (472) actual test results with expected test results. A step for executing (478) code cleanup instructions may include an act of calling (476) a code cleanup routine. A step for executing (482) optional code cleanup instructions may include an act of calling (480) an optional code cleanup routine. Processing continues by checking (484) for a next code section and returning to decision block 434 to determine if a code section remains to be processed.

A step for executing (488) group cleanup instructions may include an act of calling (486) a group cleanup routine. A step for executing (492) optional group cleanup instructions may include an act of calling (490) an optional group cleanup routine. Processing continues by checking (494) for a next group section and returning to decision block 410 to determine if a group section remains to be processed.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
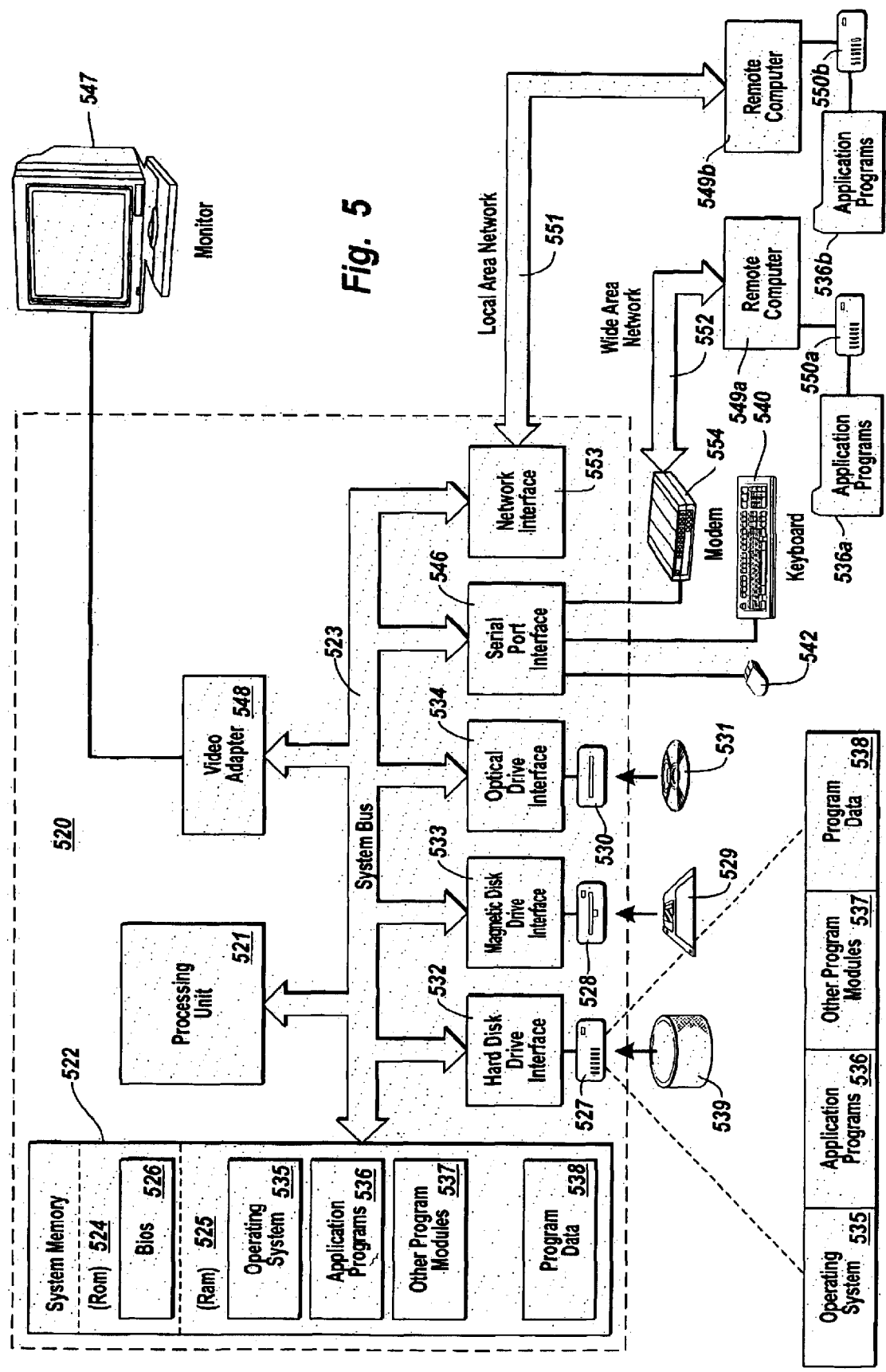
FIG. 5 illustrates an example system that provides a suitable operating environment for the present invention.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system for automated software testing to determine whether or not software operates as intended, a method of applying one or more tests to one or more software components without having to specify each test or test environment explicitly, the method comprising acts of:

reading a test file containing (i) one or more code sections that identify one or more software components to test, (ii) one or more location sections that identify one or more locations to run the one or more software components, (iii) an expandable variation section that associates the one or more software components with the one or more locations, and (iv) an expansion section that defines rules for expanding the expandable variation section;

expanding the expandable variation section to create one or more expanded variation sections, each associating a particular one of the one or more software components with a particular one of the one or more locations; and for each particular software component and location, calling a code setup routine to prepare for executing the particular software component, a code run routine to execute the particular software component for testing, and a code cleanup routine to reverse changes made by the code setup and run routines as needed.

2. A method as recited in claim 1, wherein the test file contains one or more group sections for grouping each of the one or more expanded variation sections, the method further comprising an act of, for each of the one or more group sections, calling a group setup routine prior to executing any expanded variation section within the corresponding group section, and calling a group cleanup routine after executing any expanded variation section within the corresponding group section.

3. A method as recited in claim 2, wherein the test file contains one or more set sections for logically grouping the one or more expanded variation sections.

4. A method as recited in claim 1, further comprising an act of calling an optional setup routine for a corresponding group section.

5. A method as recited in claim 1, further comprising an act of passing context information into a code section.

6. A method as recited in claim 1, wherein the expansion section identifies a list expansion algorithm which generates permutations from a list of one or more placeholders and list of one or more substitution strings.

7. A method as recited in claim 1, wherein the test file conforms to an eXtensible Markup Language (XML) schema.

8. In a computer system for automated software testing to determine whether or not software operates as intended, a computer program product comprising one or more computer readable media carrying computer executable instructions that implement a method of applying one or more tests to one or more software components without having to specify each test or test environment explicitly, the method comprising acts of:

reading a test file containing (i) one or more code sections that identify one or more software components to test, (ii) one or more location sections that identify one or more locations to run the one or more software components, (iii) an expandable variation section that associates the one or more software components with the one or more locations, and (iv) an expansion section that defines rules for expanding the expandable variation section;

expanding the expandable variation section to create one or more expanded variation sections, each associating a particular one of the one or more software components with a particular one of the one or more locations; and for each particular software component and location, calling a code setup routine to prepare for executing the particular software component, a code run routine to execute the particular software component for testing, and a code cleanup routine to reverse changes made by the code setup and run routines as needed.

9. A computer program product as recited in claim 8, the method further comprising an act of calling an optional setup routine for a corresponding code section.

10. A computer program product as recited in claim 8, the method further comprising an act of passing synchronization information into a group section.

11. A computer program product as recited in claim 8, the method further comprising an act of writing testing information to a log.

12. A computer program product as recited in claim 8, wherein the expansion section identifies a pair-wise expansion algorithm that generates unique combinations from a list of substitution strings and a number of substitution strings to be included in each unique combination.

13. A computer program product as recited in claim 8, wherein the test file contains one or more parameter sections, the method further comprising an act of accessing data within at least one of the parameter sections from a group section within a scope that includes the at least one parameter section and the group section.

14. A computer program product as recited in claim 8, the method further comprising an act of writing one or more actual test results for use in determining either a pass or fail result for a code section.

15. A computer program product as recited in claim 14, wherein the test file contains one or more expected test results, and wherein the test file references one or more result comparators, the method further comprising an act of comparing the one or more actual test results with the one or more expected test results to determine the pass or fail result for the code section.

16. In a computer system for automated software testing to determine whether or not software operates as intended, a method of applying one or more tests to one or more software components without having to specify each test or test environment explicitly, the method comprising step for:

loading and parsing a test file containing (i) one or more code sections that identify one or more software components to test, (ii) one or more location sections that identify one or more locations to run the one or more software components, (iii) an expandable variation section that associates the one or more software components with the one or more locations, and (iv) an expansion section that defines rules for expanding the expandable variation section;

creating one or more expanded variation sections from the expandable variation section, each associating a particular one of the one or more software components with a particular one of the one or more locations; and for each particular software component and location, executing setup instructions to prepare for running the particular software component, the particular software component being tested, and cleanup instructions following execution of the software component being tested.

17. A method as recited in claim 16, further comprising an act of calling an optional cleanup routine for a corresponding group section.

18. A method as recited in claim 16, further comprising a step for sharing context information between a group and a portion.

19. A method as recited in claim 16, wherein the expansion section identifies a data file expansion algorithm that replaces one or more placeholders with a comma separated list of substitutes from a data file.

20. A method as recited in claim 16, wherein the test file contains one or more parameter sections, the method further comprising an act of accessing data within at least one of the parameter sections from a code section within a scope that includes the at least one parameter section and the code section.

21. A method as recited in claim 16, further comprising a step for recording one or more actual test results for use in determining either a pass or fail result for a code section.

22. A method as recited in claim 21, wherein the test file contains one or more expected test results, and wherein the test file references one or more result comparators, the method further comprising a step for using the one or more result comparators to compare the one or more actual test results with the one or more expected test results to determine the pass or fail result for the code section.

23. A method as recited in claim 21, wherein the test file contains one or more expected test results, and wherein the test file references one or more result comparators for comparing one or more actual test results with the one or more expected test results to determine a pass or fail result for a code section.

24. In a computer system for automated software testing to determine whether or not software operates as intended, a computer program product comprising one or more computer readable media carrying computer executable instructions that implement a method of applying one or more tests to one or more software components without having to specify each test or test environment explicitly, the method comprising steps for:

loading and parsing a test file containing (i) one or more code sections that identify one or more software components to test, (ii) one or more location sections that identify one or more locations to run the one or more software components, (iii) an expandable variation section that associates the one or more software components with the one or more locations, and (iv) an expansion section that defines rules for expanding the expandable variation section;

creating one or more expanded variation sections from the expandable variation section, each associating a particular one of the one or more software components with a particular one of the one or more locations; and for each particular software component and location, executing setup instructions to prepare for running the particular software component, the particular software component being tested, and cleanup instructions following execution of the software component being tested.

25. A computer program product as recited in claim 24, the method further comprising an act of calling an optional cleanup routine for a corresponding code section.

26. A computer program product as recited in claim 24, wherein the test file contains at least two code sections, the method further comprising a step for sharing synchronization information between the at least two code sections.

27. A computer program product as recited in claim 24, the method further comprising a step for recording testing information in a log.

28. A computer program product as recited in claim 27, wherein testing information is recorded in the log based on the selection of one or more logging levels comprising at least one of an always level, an error level, a warn level, and a trace level.

29. A computer program product as recited in claim 24, wherein the expansion section identifies a range expansion algorithm that substitutes all values within a range defined by a lower and upper limit for a placeholder.

30. For an automated software testing system used to determine whether or not software operates as intended, a computer program product comprising one or more computer readable media for applying one or more tests to one or more software components without explicitly having to specify each test or test environment, the computer program product carrying a test file that comprises:
    one or more code sections that identify one or more software components to test;
    one or more location sections that identify one or more locations to run the one or more software components;
    at least one expandable variation section that associates the one or more software components with the one or more locations; and
    an expansion section that defines rules for creating one or more expanded variation sections and associating a particular software component with a particular location.

31. A computer program product as recited in claim 30, wherein the test file further comprises one or more group sections for grouping each of the one or more expanded variation sections.

32. A computer program product as recited in claim 31, wherein the test file contains one or more parameter sections for access from a code or group section within a scope that includes the at least one parameter section and the code or group section.

33. A computer program product as recited in claim 30, wherein the test file further comprises one or more set sections for logically grouping the one or more expanded variation sections.

34. A computer program product as recited in claim 30, wherein the expansion section identifies an expansion algorithm comprising at least one of (i) a list expansion algorithm which generates permutations from a list of one or more placeholders and list of one or more substitution strings, (ii) a pair-wise expansion algorithm that generates unique combinations from a list of substitution strings and a number of substitution strings to be included in each unique combination, (iii) a data file expansion algorithm that replaces one or more placeholders with a comma separated list of substitutes from a data file, and (iv) a range expansion algorithm that substitutes all values within a range defined by a lower and upper limit for a placeholder.

35. A computer program product as recited in claim 30, wherein the test file conforms to an eXtensible Markup Language (XML) schema.

* * * * *